April 16, 1968     J. S. VALE ETAL     3,378,736
DIODE PACKAGING WITH INTEGRAL HEAT SINK
Filed Oct. 20, 1965     2 Sheets-Sheet 1
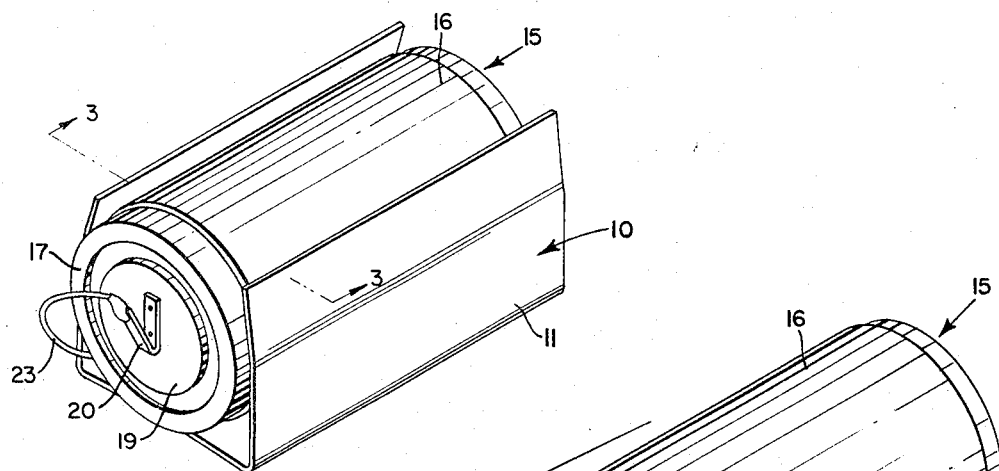
FIG. 1
FIG. 2
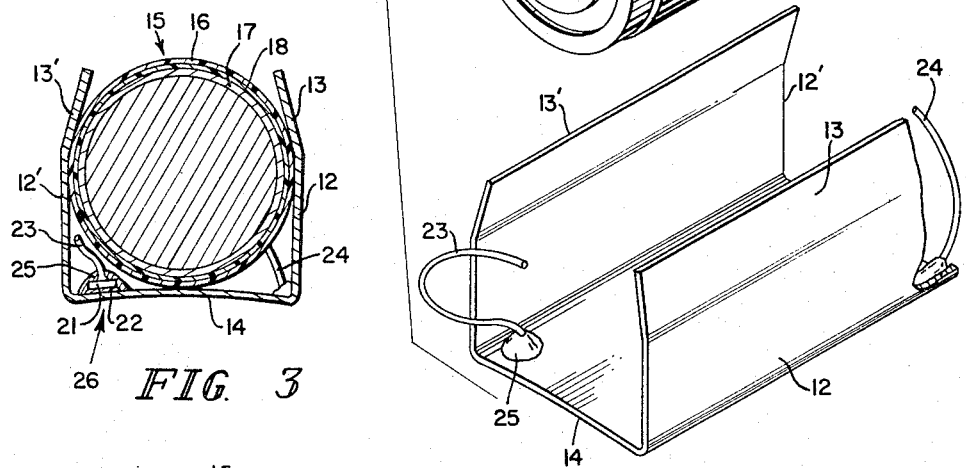
FIG. 3
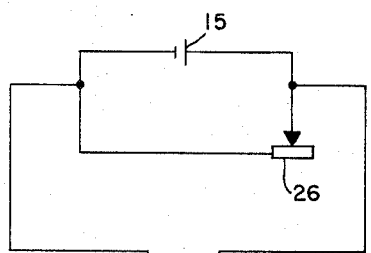
FIG. 6
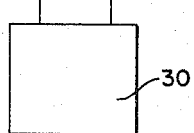
INVENTORS
JOHN S. VALE
DANIEL I. POMERANTZ
BY
ATTORNEY April 16, 1968  J. S. VALE ETAL  3,378,736
DIODE PACKAGING WITH INTEGRAL HEAT SINK
Filed Oct. 20, 1965  2 Sheets-Sheet 2

INVENTORS
JOHN S. VALE
DANIEL I. POMERANTZ
BY
ATTORNEY 3,378,736
DIODE PACKAGING WITH INTEGRAL HEAT SINK
John S. Vale, Malden, and Daniel I. Pomerantz, Lexington, Mass., assignors to P. R. Mallory & Co. Inc., Indianapolis, Ind., a corporation of Delaware
Filed Oct. 20, 1965, Ser. No. 498,411
12 Claims. (Cl. 317—234)

ABSTRACT OF THE DISCLOSURE

A recharging means for a rechargeable battery cell comprised of a heat sink and a semiconductor having at least two terminals mounted on the heat sink in heat exchange contact therewith. The heat sink includes means for retaining the rechargeable battery cell.

---

The present invention relates generally to the manufacture of a means for allowing electrical energy to flow from a source to a rechargeable secondary cell only under predetermined conditions, more particularly, to a semiconductor having an integral heat sink and support means and to a method of manufacturing the semiconductor having an integral heat sink and support means.

It is known the recharging of a secondary cell may be accomplished by reconstituting the electrodes of the cell. However, a simple and effective means capable of providing an extremely fast recharge of the cell is a desideratum. Such means also should be manufactured by automated procedures with simplicity and ease. This the present invention does.

Initially, during the recharge cycle of a secondary cell, substantially all the electrical energy supplied by a recharging source to the secondary cell is converted into chemical energy. During this phase of the recharging cycle, no heat or an insignificant amount of heat is evolved thereby having substantially no deleterious effect on the characteristics of the secondary cell. Also, during this phase of the recharge cycle of the secondary cell, oxygen is evolved at one of the electrodes of the cell and, thereafter, the oxygen is chemically reduced at the other electrode of the secondary cell. The chemical reduction of the oxygen at the other electrode is substantially continuous until such time as the secondary cell has its electrodes fully reconstituted. When the electrodes are fully reconstituted, the cell has attained its so-called "fully charged state." It is known that continued recharging of the cell after the cell has reached its "fully recharged state" may result in the existence of deleterious conditions because the secondary cell may not thereafter successfully reduce the oxygen at the second electrode at the same rate at which it is evolved at the first electrode. Therefore, if over-charging of the secondary cell is continued at a rate in excess of an equilibrium charge rate, the electrodes of the secondary cell may be seriously damaged. If the secondary cell is hermetically sealed, oxygen not reduced will accumulate within the cell thereby increasing the internal pressure of the secondary cell. It is seen that subjection of the secondary cell to a prolonged overcharging time period may cause the oxygen to accumulate to the point that the internal pressure of the cell is such that the secondary cell may rupture and/or explode thereby rendering the cell inoperative for its intended purpose.

In addition to the oxygen accumulation causing an increase in the internal pressure of the cell if the recharging continues at a rate in excess of the equilibrium charge rate, and the damage suffered by the electrodes, harmful heat is generated within the secondary cell. The heat is produced as a result of the secondary cell not being capable of converting the electrical energy into chemical energy. The heat evolved within the secondary cell causes the voltage of the cell to fall.

A maximum overcharging current to which a secondary cell may be subjected for extended periods was established for nickel-cadmium cells by industry as being C/10, where C is the normal capacity of the nickel-cadmium cell. Recharging at the accepted rate establishes an equilibrium condition wherein the rate of evolution of oxygen at one electrode of the cell is equal to the rate of reduction of the evolved oxygen at the other electrode of the cell. It is seen for a 1.25 AH nickel-cadmium cell, that C/10=0.125 ampere. Other types of secondary cells may have other equilibrium rates. For instance silver-cadmium cells have an equilibrium recharging rate of approximately C/100.

Acceptance of the "cordless" electric appliance by the public is becoming more widespread in household items such as electric shavers, electric toothbrushes and the like. Generally, the "cordless" appliance uses as a source of electrical energy a rechargeable secondary cell such as a nickel-cadmium cell or the like. It was found that the operator of the "cordless" electric appliance cannot be expected to accurately terminate the recharging cycle of the secondary cell in order to avoid overcharging the secondary cell. Since there is no presently available simple and economic method that can be utilized by the operator of the secondary cell to determine the charge remaining in the secondary cell of the "cordless" appliance, the C/10 rate of recharge is the maximum safe rate of equilibrium recharging accepted by industry to recharge a nickel-cadmium battery. As a general rule, the C/10 recharge rate requires from 14 to 16 hours to reconstitute the electrodes of the nickel-cadmium cell since the process of reconstitution is less than 100 percent efficient in actual practice.

The means and method of the present invention allow individual cells of a battery to be recharged at a significantly faster rate yet prevents the individual cells of the battery from being overcharged by shunting substantially all of the recharging current around the cooperatively associated secondary cell at or immediately prior to the associated secondary cell attaining its fully recharged state. The fully recharged state is indicated by a preselected voltage taken across the terminals of the secondary cell. The means and methods of the present invention shunt substantally all the current produced by the recharging source of electrical energy except for an equilibrium current which "trickle charges" the individual secondary cell after the electrodes of the cell have been reconstituted. Each of the cells of a possible plurality of serially connected secondary cells is provided with its individual means of the present invention so that each cell may be fully reconstituted independent of the initial state of charge of the other secondary cells of the battery. This structure takes into account the slight electrochemical variations between the serially connected cells that may effect the charging rate of each cell. By using the means and methods of the present invention, recharging time durations in the order of 2 to 3 hours may be achieved as compared to the 14 to 16 hours of recharge time required by several of the prior art devices.

The means and method of the present invention act as a voltage sensitive semiconductor means to shunt the recharging current around its cooperatively associated cell when the cell reaches a predetermined recharge voltage. A specially formed heat sink and support means is utilized for retaining a secondary cell and as a means for allowing the semiconductor means to take advantage of a negative temperature coefficient. The formed heat sink and support means of the present invention includes a semiconductor whose forward current-voltage characteristic approaches the reverse current-voltage characteristic of a Zener diode or of an avalanche diode because of the use of the specially formed heat sink and support means. The combination specially formed heat sink and support means and the semiconductor permit the semiconductor to shunt larger amounts of the recharging current around the cooperatively associated cell than would otherwise be possible when the cell voltage reaches a predetermined voltage.

Accordingly, an object of the present invention is to provide a method for assembling a semiconductor with an integral heat sink and support means of specified physical configuration.

Another object of the present invention is to provide a method for assembling a semiconductor with an integral heat sink and support means which is of sturdy construction and so composed as to be a self-contained device that is characterized by its accuracy of operation.

A further object of the present invention is to provide a method for assembling a semiconductor with an integral heat sink and support means that is efficient yet inexpensive and simple to manufacture.

Yet still another object of the present invention is to provide a method for assembling a semiconductor with an integral heat sink and support means that lends itself to automated manufacturing techniques and high volume production.

Another object of the present invention is to provide a semiconductor with an integral heat sink and support means that is designed so as to optimize the forward electrical characteristics of the semiconductor.

Yet still another object of the present invention is to provide a semiconductor with an integral heat sink and support means wherein the heat sink is thermally insulated from other means that may change its thermal characteristics.

A further object of the present invention is to provide a diode that is protected from humidity, dust, and other contaminates, and also shock and vibration.

Still another object of the present invention is to provide a diode with an integral heat sink and support means that shunts a recharging current around a cooperatively associated secondary cell when the cell reaches a predetermined recharged voltage.

Yet another object of the present invention is to provide a diode with an integral heat sink cooperatively associated with a secondary cell wherein the reconstitution of the electrodes of the cell may be accomplished within 3 hours or less.

The present invention, in another of its aspects, relates to novel features of the instrumentalities described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Also other objects wil appear in the following description, appended claims, and appended drawings. The invention resides in the novel method and the novel construction, combination, arrangement, and co-operation of elements as hereinafter described and more particularly as defined in the appended claims.

The appended drawings illustrate the present invention constructed to function for the practical application of the basic principles involved in the hereinafter described invention.

In the drawings:

FIGURE 1 is a perspective view of a U-shaped heat sink and support means of the present invention illustrating a secondary cell securely retained therein.

FIGURE 2 is a perspective view of the U-shaped heat sink and support means of the present invention with a secondary cell removed showing the location of the diode leads.

FIGURE 3 is a cross-sectional view taken across line 3—3 of FIGURE 1 illustrating the location of the diode wafer on the U-shaped heat sink and support means, the heat sink and support means retaining a secondary cell.

FIGURE 6 is an electrical schematic illustrating a charging circuit for recharging a secondary cell.

Figure 7:
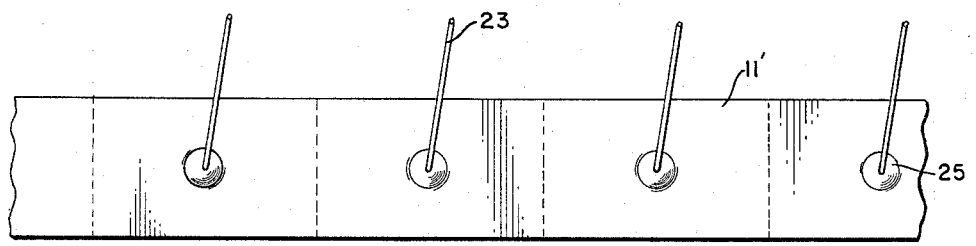
FIGURE 7 shows a plurality of semiconductor and integral heat sink and support means fabricated on a continuous strip.
Figure 8:
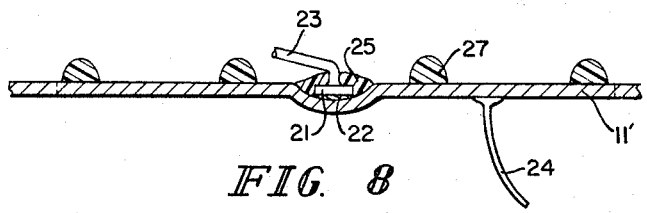
FIGURE 8 shows a cross-sectional side view of a semiconductor and integral heat sink and support means having insulative ribs.

Generally speaking, the present invention relates to means and methods for regenerating the electrodes of a secondary cell. More particularly, the means of the present invention relates to a combination of a source of electrical energy and a secondary cell recharging means coupled in series. The recharging means comprises a semiconductor and an integral heat sink and support means. The heat sink may be either U-shaped, semicircular-shaped or any other suitable shape. If the heat sink is U-shaped, the side walls of the U-shaped heat sink include means for fixedly retaining therebetween a secondary cell. However, if the heat sink is semicircular-shaped, the heat sink carries a plurality of insulative ribs in spaced, parallel relationship that couple the heat sink to the secondary cell in spaced relationship. An electrically conductive lead is connected between the semiconductor and an electrode of the secondary cell. Another electrically conductive lead is connected between the heat sink and another electrode of the secondary cell. The semiconductor and integral heat sink and support means is substantially non-conductive when the voltage of the secondary cell is below a predetermined value thereby allowing the electrical energy of the source to flow to the cell so as to recharge the cell. However, when the voltage of the cell is greater than the predetermined voltage value, the semiconductor and integral heat sink and support means is conductive thereby shunting the electrical current of the source around the secondary cell to substantially terminate the recharging of the secondary cell.

The method of manufacture of the semiconductor with an integral heat sink and support means of specific physical configuration for use in recharging a secondary cell is economical and simple. The method comprises several steps. First, a continuous strip of electrically conductive metal is prepared by stamping a plurality of rows of transverse markings or perforations in the continuous metal strip. The perforations allow the individual units to be separated each from the other. At substantially the same time, an indentation is stamped into the strip centered between each pair of rows of spaced, parallel perforations. A semiconductor wafer is attached to the indentation by soldering. A semiconductor lead is affixed to the wafer and thereafter the indentation is filled with a moisture-resistant protective coating so as to seal the wafer against external contamination. A second semiconductor lead is attached to the side of each individual metal strip. The strips are thereafter separated each from the other thereby forming a semiconductor with an integral heat sink for use in recharging a secondary cell. Thereafter, the heat sink is so shaped so that the heat sink may retain therewithin a secondary cell. The conductive leads of the device are connected to the electrodes of the secondary cell to thereby produce a completed semiconductor with integral heat sink and support means of specific configuration.

Referring now to the drawings, which illustrate embodiments of the present invention, the diode with an integral heat sink and support means is illustrated generally as 10. FIGURES 1 to 3 show the diode with an integral heat sink and support means that is substantially U-shaped. The U-shaped heat sink and support means may be fabricated from any suitable metal having a high thermal conductivity such as aluminum, copper or the like. The side walls 12 and 12' include angulated portions 13 and 13'. The reason for the angulated portions will be disclosed hereinafter.

Figures 4, 5:
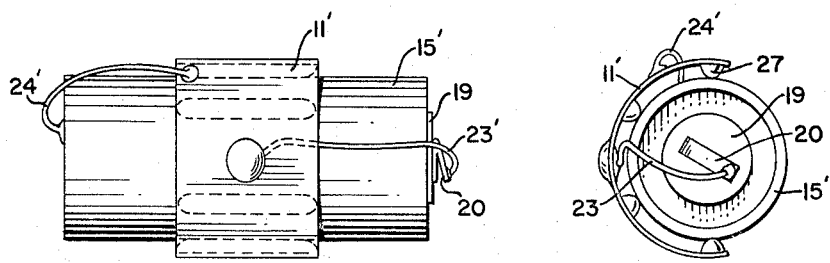
FIGURE 4 is an embodiment of the present invention illustrating a semicircular heat sink and support means retaining therein a secondary cell.
FIGURE 5 is a side view of the embodiment of the present invention illustrated in FIGURE 4 showing the position of insulative ribs that hold the secondary cell in spaced relationship with respect to the semicircular heat sink and support means.

The side walls 12 and 12' are joined by member 14. As illustrated in FIGURE 3, the integral heat sink and support means 11 is U-shaped except for angulated portions 13 and 13' which are angled toward each other. A secondary cell 15 is illustrated in FIGURES 1 and 3 as being retained by the U-shaped heat sink and support means 11. More specifically, the secondary cell 15 is frictionally retained by side walls 12 and 12', angulated portions 13 and 13' and member 14 in a clip-like manner. The secondary cell may be a nickel-cadmium cell that has an outer sleeve 16 fabricated from any suitable electrically insulative material such as plastic or the like. If the secondary cell does not incorporate an outer sleeve, insulating ribs such as shown in FIGURE 5 may be included on the U-shaped member. Immediately under the electrically insulative sleeve is a casing 17 fabricated from any suitable metal such as nickel-plated steel or the like. The layer under the casing is an inner absorbent sleeve 18, and the innermost portion of the secondary cell is composed of any suitable active ingredients such as nickel-cadmium or the like. An end cap 19 is affixed to both ends of the secondary cell by any suitable means, such as by crimping, pressure welding, soldering or the like. Each end cap 19 of the secondary cell includes a V-shaped tab 20 that is connected to the electrodes of the secondary cell.

A semiconductor wafer 21 fabricated from any suitable material such as germanium, silicon or the like is attached to member 14 of the U-shaped heat sink and support means by any suitable material such as solder 22. It is seen that the solder serves to fixedly retain the wafer on the U-shaped heat sink and support means and also serves to electrically connect the wafer to the heat sink. An electrically conductive lead 23 is affixed to the major surface of the wafer thereby forming a contact. The other extremity of the electrically conductive lead 23 is coupled to tab 20 of the secondary cell by solder or other suitable material as illustrated in FIGURE 1. A second electrically conductive lead 24 is affixed to the other extremity of the U-shaped heat sink diagonally opposite the lead 23. Conductive lead 24 is coupled to a tab (not shown) in a manner similar to that of the connection of lead 23 to tab 20. The wafer 22 is completely covered by any suitable insulative material such as epoxy resin 25. The epoxy resin coating over the wafer serves to protect the wafer from humidity, dust or other like contaminates. The epoxy resin also serves to protect the wafer from shock and vibration.

The form of the U-shaped heat sink and support means 11 is such as to optimize the forward electrical characteristics of the diode 26. When the secondary cell reaches its fully recharged state, the cell voltage triggers the diode to conduction thereby providing a shunt path for the output of the source of electrical energy around the secondary cell. The combination of the diode with an integral heat sink draws only slight amounts of current until the cell attains a fully recharged state at which time the diode passes from a relatively high impedance state where its dynamic impedance is relatively low. Immediately above the predetermined voltage the diode passes through a region of zero dynamic impedance.

As indicated hereinbefore, the U-shaped heat sink and support means serves to thermally isolate the diode from the secondary cell and provides a thermal feedback path to the diode. In order to insure that the secondary cell has no effect on the heat sink, the secondary cell is covered by the outer sleeve 18 fabricated from any heat and electrically insulative material such as plastic or the like. The U-shaped heat sink and support means provides a temperature feedback path that maintains a substantially constant forward voltage drop over the operating current range. The heating effect becomes important only when the secondary cell voltage approaches the terminal voltage. No significant increase in the leakage current at voltages lower than the breakdown voltage of the diode was noted.

FIGURES 4 and 5 show another embodiment of the present invention wherein the heat sink and support means is not U-shaped but rather substantially semicircular shaped. The semicircular shaped heat sink and support means 11' retains thereon a wafer (not shown) in a manner similar to the manner in which wafer 21 is retained on the U-shaped heat sink and clip means. A plurality of longitudinal ribs 27 are fabricated on the semicircular heat sink and support means in spaced, parallel relationship. The ribs serve two functions which are: to thermally isolate the heat sink from the cell, and possibly to provide a predetermined space between the cell and the heat sink for the conductive lead 23' connected to the wafer so that the conductive lead may be easily attached to terminal 20' of the secondary cell 15'. A semiconductive lead 24' is fixedly coupled to the other terminal (not shown) of the secondary cell. The diode with integral semicircular heat sink and support means performs substantially the same function as the diode with an integral heat sink and support means that is U-shaped in substantially the same manner as described hereinbefore.

FIGURE 6 shows an electrical schematic illustrating a charging circuit for recharging a secondary cell. A source of electrical energy 30 is coupled in series with the parallel combination of the diode with an integral heat sink and support means and secondary cell 15. For convenience only the diode 26 of the diode with an integral heat sink and support means is shown. The electrical schematic illustrates that the positive terminal of the source of electrical energy is coupled to the anode of the diode and to the positive terminal of the secondary cell. The cathode of the diode and the negative terminal of the secondary cell are coupled to the negative side of the source of electrical energy. It is seen that charging current flows from the positive side of the source of electrical energy to the positive side of the secondary cell. The diode conducts relatively low values of current when the voltage of the secondary cell is below a predetermined value thereby allowing the electrical energy of the source to flow to the cell so as to recharge the cell. However, the semiconductor is more conductive when the voltage of the cell is greater than the predetermined voltage value thereby shunting the electrical energy of the source of electrical energy around the secondary cell to substantially terminate the recharging of the secondary cell.

The device illustrated in FIGURES 1 to 3 and FIGURES 4 to 5 is fabricated by first selecting a continuous strip of metal of aluminum, copper or the like. A means (not shown) stamps a plurality of spaced, parallel perforations on the continuous strip. At substantially the same time an indentation of predetermined dimensions is stamped between each pair of rows of spaced, parallel perforations. The dimensions of the stamped indentations are determined by the physical dimensions of the wafer.

The next step in fabricating the diode with an integral heat sink is to fixedly attach a wafer to the lowermost point of the indentation by any suitable means such as by soldering or the like. The solder serves the function of physically bonding the wafer to the metal strip.

A conductive lead 23 is attached to the major surface of the wafer thereby forming a contact. The conductive lead 23 is of sufficient length so as to extend from the wafer to V-shaped tab 20 of the secondary cell. After the conductive lead 23 is attached to the wafer, the indentation is filled with epoxy resin so that the wafer is covered with the resin. The resin protects the wafer and the point at which the conductive lead 23 is connected to the wafer from humidity, dust and other contaminates.

A second diode lead 24 is attached to the opposite side of the metallic strip by any suitable means such as by welding or the like. The second diode lead is of sufficient length so that the lead may electrically couple the strip of metal to the other terminal of the secondary cell.

The continuous metal strip is then torn along the perforations and thereafter formed into the U-shape shown in FIGURES 1 to 3. Each diode lead is fixedly attached to the corresponding secondary cell terminal to form the unit as shown in FIGURES 1 and 3.

If it is desired to fabricate a semicircular-shaped semiconductor with an integral heat sink, prior to the tearing of the continuous strip along the perforations or the like, a plurality of spaced, parallel ribs are secured to the heat sink. The ribs are placed on the inner surface of the heat sink so that the ribs engage with the secondary cell in such a manner so as to space the semicircular heat sink from the secondary cell.

While the invention is described and illustarted with reference to a specific means and method, it will be understood that modifications and variations may be effected without departing from the scope of the novel concepts of my invention and as set forth in the appended claims.

Having thus described our invention, we claim:

1. In combination a rechargeable battery cell and a protective recharging means connected in circuit therewith comprising, a recharging means comprising a heat sink and a semiconductor having at least two terminals mounted on said sink in heat exchange contact therewith, one terminal electrically connected thereto, said heat sink including means for retaining said cell mounted thereon, and an electrical conductor connecting one terminal of said cell with the other terminal of the semiconductor, another electrical conductor connecting said heat sink to the other terminal of said cell, said heat sink comprising temperature means responsive to the voltage applied across said battery cell and said semiconductor comprising resistivity means responsive to the temperature of said heat sink for bypassing currents above a specified rating around said cell.

2. In combination a plurality of serially connected rechargeable battery cells and a plurality of protective recharging means respectively shunting said cells comprising, a plurality of recharging means each comprising a heat sink and a semiconductor having at least two terminals mounted on said sink in heat exchange contact therewith, one terminal electrically connected thereto, said heat sink including means for retaining said cell mounted thereon, and an electrical conductor connecting one terminal of said cell with the other terminal of the semiconductor, another electrical conductor connecting said heat sink to the other terminal of said cell, said heat sink comprising temperature means responsive to the voltage applied across said battery cell and said semiconductor comprising resitivity means responsive to the temperature of said heat sink for bypassing currents above a specified rating around said cell.

3. In combination a rechargeable battery cell and a protective recharging means shunting said cell comprising, a recharging means comprising a heat sink and a semiconductor having at least two terminals mounted on said sink in heat exchange contact therewith, one terminal electrically connected thereto, said heat sink including means for retaining said cell mounted thereon, and an electrical conductor connecting one terminal of said cell with the other terminal of the semiconductor, another electrical conductor connecting said heat sink to the other terminal of said cell, insulative means covering said semiconductor, said heat sink comprising temperature means responsive to the voltage applied across said battery cell and said semiconductor comprising resistivity means responsive to the temperature of said heat sink for bypassing currents above a specified rating around said cell.

4. In combination a rechargeable battery cell and a protective recharging means shunting said cell comprising, a recharging means comprising a heat sink and a diode mounted on said sink in heat exchange contact therewith, one terminal of said diode electrically connected thereto, said heat sink including means for retaining said cell mounted thereon, and an electrical conductor connecting one terminal of said cell with the other terminal of the diode, another electrical conductor connecting said heat sink to the other terminal of said cell, said heat sink comprising temperature means responsive to the voltage applied across said battery cell and said diode comprising resistivity means responsive to the temperature of said heat sink for bypassing currents above a specified rating around said cell.

5. In combination a rechargeable secondary cell and a protective recharging means shunting said cell comprising, a recharging means comprising a heat sink and a diode fixedly connected to said sink in heat exchange contact therewith, one terminal of said diode electrically connected thereto, said heat sink including resilient side walls for retaining said cell mounted thereon, and an electrical conductor connecting one terminal of said cell with the other terminal of the diode, another electrical conductor connecting said heat sink to the other terminal of said cell, said heat sink comprising temperature means responsive to the voltage applied across said secondary cell and said diode comprising resistivity means responsive to the temperature of said heat sink for bypassing currents above a specified rating around said cell.

6. In combination a rechargeable secondary cell and a protective recharging means shunting said cell comprising, a recharging means comprising a heat sink and a diode fixedly connected to said sink in heat exchange contact therewith, one terminal of said diode electrically connected thereto, said heat sink including resilient side walls in spaced relationship for retaining said cell therebetween, and an electrical conductor connecting one terminal of said cell with the other terminal of the diode, another electrical conductor connecting said heat sink to the other terminal of said cell, said heat sink comprising temperature means responsive to the voltage applied across said secondary cell and said diode comprising resistivity means responsive to the temperature of said heat sink for bypassing currents above a specified equilibrium current around said cell.

7. In combination a plurality of serially connected rechargeable secondary cells and a plurality of protective recharging means respectively shunting said cells comprising, a plurality of recharging means each comprising a substantially U-shaped heat sink and a diode fixedly connected to said sink in heat exchange contact therewith, one terminal of said diode electrically connected thereto, said heat sink including resilient side walls in spaced relationship for retaining said cell therebetween, and an electrical conductor connecting one terminal of said cell with the other terminal of the diode, another electrical conductor connecting said heat sink to the other terminal of said cell, said heat sink comprising temperature means responsive to the voltage applied across said secondary cell and said diode comprising resistivity means responsive to the temperature of said heat sink for bypassing currents above a specified equilibrium current around said cell.

8. In combination a rechargeable secondary cell and a protective recharging means shunting said cell comprising, a recharging means comprising a resilient substantially semicircular-shaped heat sink and a diode fixedly connected to said sink in heat exchange contact therewith, one terminal of said diode electrically connected thereto, said heat sink including means for retaining said cell mounted thereon, and an electrical conductor connecting one terminal of said cell with the other terminal of the diode, another electrical conductor connecting said heat sink to the other terminal of said cell, said heat sink comprising temperature means responsive to the voltage applied across said secondary cell and said diode comprising resistivity means responsive to the temperature of said heat sink for bypassing currents above a specified equilibrium current around said cell.

9. In combination a rechargeable secondary cell and a protective recharging means shunting said cell comprising, a recharging means comprising a resilient substantially semicircular-shaped heat sink and a diode fixedly connected to said sink in heat exchange contact therewith, one terminal of said diode electrically connected thereto, said heat sink including means for retaining said cell mounted thereon and insulative rib means for maintaining said heat sink spaced from said sink, and an electrical conductor connecting one terminal of said cell with the other terminal of the diode, another electrical conductor connecting said heat sink to the terminal of said cell, said heat sink comprising temperature means responsive to the voltage applied across said secondary cell and said diode comprising resistivity means responsive to the temperature of said heat sink for bypassing currents above a specified equilibrium current around said cell.

10. In combination a rechargeable battery cell and a protective recharging means connected in circuit therewith comprising, a recharging means comprising a heat sink and a semiconductor having at least two terminals mounted on said sink in heat exchange contact therewith so that a predetermined amount of heat feedback to said semiconductor occurs, one terminal electrically connected thereto, said heat sink including means for retaining said cell mounted thereon, and an electrical conductor connecting one terminal of said cell with the other terminal of the semiconductor, another electrical conductor connecting said heat sink to the other terminal of said cell, said heat sink comprising temperature means responsive to the volltage applied across said battery cell by raising the temperature of said semiconductor in a controlled manner in order to achieve an operating region of thermally induced resistance when the voltage of said cell exceeds a determined voltage, thereafter said semiconductor bypassing currents above a specified equilibrium current around said cell.

11. In combination a rechargeable secondary cell and a protective recharging means shunting said cell comprising, a recharging means comprising a heat sink and a diode fixedly connected to said sink in heat exchange contact therewith so that a predetermined amount of heat feedback to said semiconductor occurs, one terminal of said diode electrically connected thereto, said heat sink including means for retaining said cell mounted thereon, and an electrical conductor connecting one terminal of said cell with the other terminal of the diode, another electrical conductor connecting said heat sink to the other terminal of said cell, said heat sink comprising temperature means responsive to the voltage applied across said secondary cell by raising the temperature of said diode in a controlled manner in order to achieve an operating region of thermally induced resistance when the voltage of said cell exceeds a determined voltage, thereafter said diode bypassing currents above a specified equilibrium current around said cell.

12. In combination a plurality of serially connected rechargeable secondary cells and a plurality of protective recharging means respectively shunting said cell comprising, a plurality of recharging means each comprising a heat sink and a diode fixedly connected to said sink in heat exchange contact therewith so that a predetermined amount of heat feedback to said semiconductor occurs, one terminal of said diode electrically connected thereto, said heat sink including means for retaining said cell mounted thereon, and an electrical conductor connecting one terminal of said cell with the other terminal of the diode, another electrical conductor connecting said heat sink to the other terminal of said cell, said heat sink comprising temperature means responsive to the voltage applied across said secondary cell by raising the temperature of said diode a controlled manner in order to achieve an operating region of thermally induced resistance when the voltage of said cell exceeds a determined voltage, thereafter said diode bypassing currents above a specified equilibrium current around said cell.

References Cited

UNITED STATES PATENTS

| | | | |
|---|---|---|---|
| 2,471,011 | 5/1949 | Shapiro | 317—234 |
| 3,086,160 | 4/1963 | Loftus | 320—40 |
| 3,148,322 | 9/1964 | Booe et al. | 320—43 |
| 3,312,889 | 4/1967 | Gold | 320—40 |

JAMES D. KALLAM, *Primary Examiner.*